United States Patent [19]
Moser

[11] Patent Number: 4,823,549
[45] Date of Patent: Apr. 25, 1989

[54] APPARATUS FOR COLLECTING SOOT FROM EXHAUST GASES OF AN AIR-COMPRESSING, SELF-IGNITING INTERNAL COMBUSTION ENGINE

[75] Inventor: Franz Moser, Steyr, Austria

[73] Assignee: Steyr-Daimler-Puch Aktiengesellschaft, Vienna, Austria

[21] Appl. No.: 129,867

[22] Filed: Dec. 4, 1987

Related U.S. Application Data

[63] Continuation of Ser. No. 844,836, Mar. 17, 1986, abandoned.

[30] Foreign Application Priority Data

Apr. 2, 1985 [AT] Austria ................................ 980/85

[51] Int. Cl.⁴ .......................... F01N 3/02; B07D 41/00
[52] U.S. Cl. ........................................ 60/275; 55/296; 55/430; 55/DIG. 30; 60/311
[58] Field of Search ................. 60/275, 295, 309, 311; 55/296, 430, DIG. 30

[56] References Cited

U.S. PATENT DOCUMENTS 3,236,045 2/1966 Berger .................................. 60/311
3,350,877 11/1967 Bowman .............................. 60/311
3,559,760 2/1971 Ninomiya ............................ 60/311
4,000,994 1/1977 Youhouse ............................ 60/311

FOREIGN PATENT DOCUMENTS 2336615 1/1975 Fed. Rep. of Germany .
689690 4/1953 United Kingdom .................. 55/296

Primary Examiner—Douglas Hart
Attorney, Agent, or Firm—Kurt Kelman

[57] ABSTRACT

Apparatus for collecting soot from soot-laden exhaust gases flowing in an exhaust gas line of an air-compressing compression ignition engine comprises a housing adapted to be incorporated in said exhaust gas line and to be flown through by said soot-laden exhaust gases; baffle walls contained in said housing and arranged to repeatedly deflect the exhaust gases flowing through said housing and to cause soot to be separated from said exhaust gases and to deposit at least in part on said baffle walls; and an accumulating container disposed under said baffle walls and arranged to receive soot which has been separated from said exhaust gases at said baffle walls. Said apparatus is designed to permit soot deposited on at least part of baffle walls to be removed therefrom and to fall into said accumulating container. Said container is designed to permit soot accumulated in said container to be removed from said apparatus.

19 Claims, 1 Drawing Sheet

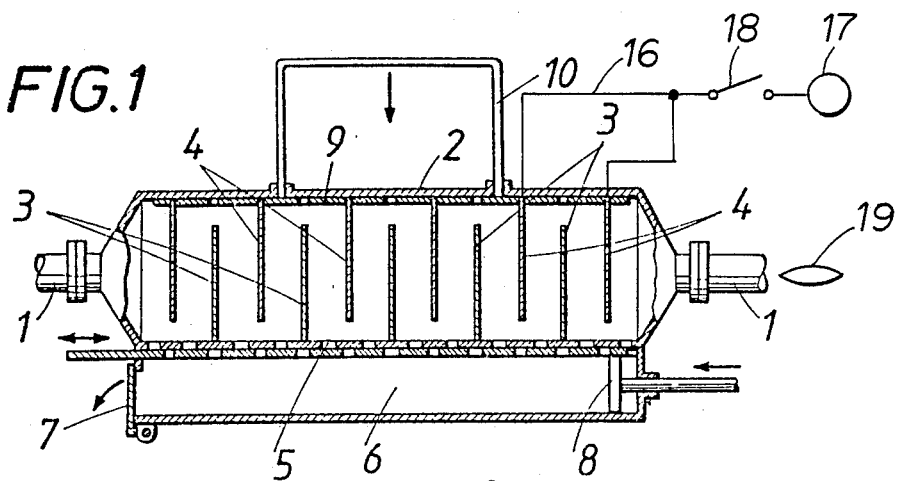
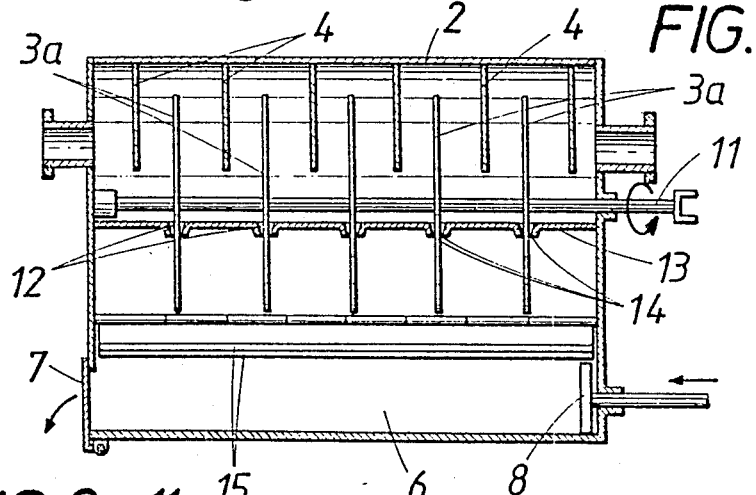
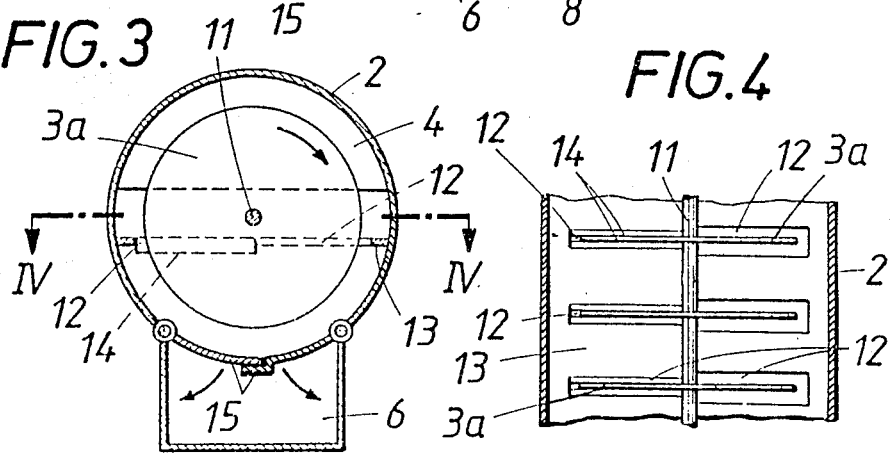

APPARATUS FOR COLLECTING SOOT FROM EXHAUST GASES OF AN AIR-COMPRESSING, SELF-IGNITING INTERNAL COMBUSTION ENGINE

REFERENCE TO RELATED APPLICATIONS

This is a continuation application of application Ser. No. 844,836, filed Mar. 17, 1986, now abandoned, for "APPARATUS FOR COLLECTING SOOT FROM EXHAUST GASES OF AN AIR-COMPRESSING, SELF-IGNITING INTERNAL COMBUSTION ENGINE".

BACKGROUND OF THE INVENTION

1. Field of the Invention

This invention relates to apparatus for collecting soot from the exhaust gases of an air-compressing, self-igniting internal combustion engine, which apparatus comprises a housing incorporated in the exhaust gas line of the engine and arranged to be flowed through by the exhaust gases, baffle walls contained in the housing and arranged to repeatedly deflect the exhaust gas stream, and a collecting container for collecting the seperated soot particles.

2. Description of the Prior Art

In the operation of air-compressing, self-igniting internal combustion engines, i.e., diesel engines operating with direct or indirect fuel injection, the diesel cycle results in a production of exhaust gases which are laden with soot particles of various sizes. Such soot particles are produced mainly during full-load operation of the engine and their emission would pollute the environment and for this reason should be avoided. An improvement in this respect has been achieved by the provision of supercharged engines, which operate with an excess of air so that their soot emission is low. But a removal of soot to a high degree will be particularly important if various measures adopted to reduce the $NO_x$ emission result in a formation of soot at a higher rate. A reduction of the emission of both $NO_x$ and soot can be effected only by special measures, such as the provision of soot filters in the exhaust gas line of the internal combustion engines.

It is already known to provide soot filters consisting of monolithic ceramic bodies in the exhaust gas line of air-compressing, self-igniting internal combustion engines. As the exhaust gas flows through such filters, the soot particles are retained in the fine pores of the filter. But such filter must be regenerated intermittently or continuously because the soot particles retained by the filter must be removed in order to ensure that the filter will remain permeable to the exhaust gas. Otherwise the power of the internal combustion engine would be decreased and its fuel consumption would be increased or the engine might become entirely inoperative. It has been proposed to regenerate the filter in that the soot is burnt either automatically when the filter has been heated to a sufficiently high temperature of about 400° to 800° C. or by the provision of specially arranged burners for heating the filter to the required temperature. These measures involve a high structural expenditure and such regeneration may give rise to difficulties when the filter has been clogged to a relatively high degree and the engine is then operated near its upper load limit to produce exhaust gas at a relatively high temperature because this may result in a sudden burning of the soot in the filter and in a high temperature rise, by which the filter may be entirely destroyed.

It has also been proposed to remove the soot by electrostatic precipitators, in which the soot particles carrying a positive or negative electric charge are collected on electrode plates to which a voltage is applied. By means of an exhaust gas recirculating system the collected soot particles are then returned to the intake side of the internal combustion engine and further to the combustion chambers of the engine. In that case a regeneration of the filter is not required but the recirculated soot particles will increase the wear rate of the internal combustion engine, possibly to a multiple of the wear rate of engines operating without a recirculation of exhaust gases laden with soot particles.

German Patent Publication No. 21 07 745 discloses an exhaust muffler which serves also to purify the exhaust gases of internal combustion engines and comprises a housing that is arranged to be flowed through by the exhaust gases and contains baffle walls for repeatedly deflecting the exhaust gases, and a collecting container for collecting the separated dust particles. In that known muffler the baffle walls consist of partitions in the housing and are rigidly mounted in the housing, and the collecting container is constituted by the lower portion of the housing and is separated from the upper portion of the housing by a horizontal wall, which is perforated like a sieve having holes which decrease in diameter in the direction of flow of the exhaust gases through the housing. That collecting container is not accessible from the outside and cannot be emptied nor exchanged. For this reason that known exhaust muffler will inevitably be clogged in the course of time, particularly if it is used in conjunction with a diesel engine, and will then be inoperative so that it must be replaced by a new muffler. That known exhaust muffler cannot be used at all in trucks for a high mileage.

Published German Application No. 23 36 615 discloses an apparatus which also comprises baffle walls and a collecting container but does not serve to remove soot and other solid particles from the exhaust gases but to effect a condensation in the exhaust gas stream and to recycle the liquid condensate to the intake line of the engine.

SUMMARY OF THE INVENTION

It is an object of the invention to eliminate the disadvantages outlined hereinbefore and to provide an apparatus which is of the kind described first hereinbefore and which will always permit the soot to be removed and will possibly permit a utilization of the soot, which consists of high-grade, pure carbon.

This object is accomplished in accordance with the invention with a collecting container adapted to be emptied or to be exchanged and with at least some of the baffle walls being mounted in the housing to be movable in response to vibration or means are provided for scraping soot which has deposited on the baffles.

In the apparatus in accordance with the invention, those soot particles which have been deposited on the baffle walls from the repeatedly deflected exhaust gas stream can be mechanically removed from the baffle walls by the scraping means or, if the baffle walls are mounted in the housing to be movable in response to vibration said deposited soot particles will fall from the baffle walls into the container as a result of the vibration resulting from the operation of the engine or of the motor vehicle provided with that engine. The collecting container can readily be emptied or replaced. The baffle walls are continually or continuously cleaned from soot particles which have been deposited on the baffle walls so that the baffle walls remain in a fully operative condition and the permeability of the apparatus to the exhaust gases will not be adversely affected.

During normal operation the exhaust gas stream should not flow through the collecting container so as to by-pass the baffle walls. This is prevented by seperating the housing from the collecting container by a grate having openings, which are adapted to be closed, or by a wall provided with at least one shut-off flap valve.

It will be particularly desirable to provide in the collecting container a displaceable ram for compacting the soot particles which have accumulated in the container. That feature permits the provision of a compact collecting container which can accumulate a relatively large quantity of soot before the collecting container must be emptied or replaced.

In accordance with a further feature of the invention, at least some of the baffle walls consist of collecting electrodes which are electrically connected to a voltage source and adapted to be selectively disconnected therefrom. In that case the apparatus consists of an electrostatic precipitator, which in case of movably suspended collecting electrodes affords the advantage that the soot which adheres to the collecting electrodes will be caused to drop into the collecting container when the electrodes have been disconnected from the voltage source. It will be understood that the provision of baffle walls consisting of electrodes connected to a voltage source will considerably improve the efficiency of separation so that that feature may also be adopted if a separate scraping device, which is arbitrarily operable, is provided.

In a particularly desirable arrangement, at least some of the baffle walls consist of discs, which are non-rotatably connected to a rotatable shaft and extend through slots formed in a scraping plate, which is fixed in the housing. In that case the dust deposited on the discs will reliably be scraped from the discs as they rotate through the slots. The discs may be rotated during the operation of the engine, either continuously or intermittently after certain intervals of time, or may be manually rotated when the engine is at a standstill. The operation of the scraping means in general or the rotation of the discs through the slots may be effected in a controlled manner in dependence on operating parameters of the vehicle which is equipped with the internal combustion engine.

In an apparatus comprising baffle walls consisting of rotatable discs, the soot can easily be removed only from the rotatable discs and is to be deposited only on such rotatable discs rather than on any other baffle walls which may be provided. For this reason it is a feature of the invention to electrically charge the soot particles with a predetermined polarity before they enter the housing and to charge the rotatable discs with a polarity which is opposite to that of the soot particles.

As the discs are rotated, the soot deposited on and scraped from said discs should actually fall into the collecting container rather than be retained on the scraping plate in the housing space flowed through by the exhaust gases. For this purpose the invention proposes to provide the scraping plate in a substantially horizontal orientation and to form it with slots extending throughout the diameter of the discs and to provide a sliding contact between said scraping plate and said discs only at those slot portions which are passed through by upwardly rotating portions of the discs.

BRIEF DESCRIPTION OF THE DRAWING

FIG. 1 is a diagrammatic longitudinal sectional view showing apparatus for collecting soot particles from the exhaust gases of an air-compressing, self-igniting internal combustion engine.

FIG. 2 is a similar view showing a different embodiment of such apparatus.

FIG. 3 is a transverse sectional view related to FIG. 2.

FIG. 4 is a fragmentary sectional view taken on line IV—IV in FIG. 3.

DETAILED DESCRIPTION OF THE PREFERRED EMBODIMENTS

Illustrative embodiments of the invention will now be described more in detail with reference to the drawing.

An air-compressing, self-igniting internal combustion engine is represented only by its exhaust gas line 1, in which a housing 2 is incorporated, which contains baffle walls 3, 4 for repeatedly deflecting the exhaust gas stream in the housing 2. The bottom of the housing 2 is constituted by a grate 5, which is formed with slots, which are adapted to be closed. A collecting container 6 is disposed under the grate 5 and is connected to the housing 2 and provided with a discharge opening that is normally closed by a flap 7, which is adapted to be opened to empty the container 6. The container 6 contains a ram 8, which is displaceable to compact the soot particles which have accumulated in the container 6. A scraping device 9 is formed with slots, aligned with the baffle walls 3, 4. The scraping device can be moved up and down by means of a U-shaped handle 10 so that the baffle walls extend through the slots. The baffle walls may consist of electrodes, which are electrically connected via wires 16 to a voltage source 17 and may temporarily be disconnected from said source by switch 18. In that case soot particles entrained by the exhaust gases flowing through the housing 2 and electrostatically charged by a corona discharge device 19 at the inlet will be subjected to electrostatic precipitation and will deposit on the baffle walls 3, 4.

In the embodiment shown in FIGS. 2 to 4, the baffle walls 3a consist of discs, which are non-rotatably connected to a common rotary shaft 11 and which extend through slots 12 of a horizontal scraping plate 13. Only these slot portions which contain those portions of the discs 3a which move upwardly through the slots during the rotation of the discs are defined by scraping edges 14 in sliding contact with the discs 3a. That arrangement will prevent a deposition of soot on top of the scraping plate. The grate 5 shown in FIG. 1 has been replaced by a bottom provided with two flap valves 15.

In the embodiment shown in FIGS. 2 to 4, the soot particles are preferably electrically charged with a predetermined polarity by a corona discharge before they enter the housing 2 and the discs 3a are electrically charged with a polarity which is opposite to that of the soot particles so that the soot particles will deposit only on the rotatable discs 3a.

What is claimed:

1. In an apparatus for collecting soot from soot-laden exhaust gases, flowing in an exhaust gas line of an air-compressing internal combustion engine, said apparatus comprising a housing adapted to be incorporated in said exhaust gas line to allow said soot-laden exhaust gases to pass therethrough, baffle walls contained in said housing and arranged to repeatedly deflect the exhaust gases flowing through said housing to cause soot to be separated from said exhaust gases and to deposit, at least in part, on said baffle walls, and an accumulating container disposed beneath said baffle walls and arranged to receive soot which has been separated from said exhaust gases at said baffle walls, the improvement comprising:

means included in said apparatus to cause soot deposited on at least part of said baffle walls to be be removed therefrom and to fall into said accumulating container;

said accumulating container being adapted to permit soot accumulated in said container to be removed from said apparatus;

a grate having openings disposed between said housing and said accumulating container; and means provided for selectively closing the openings of said grate.

2. The improvement set forth in claim 1, wherein said accumulating container is detachably connected to said housing.

3. The improvement set forth in claim 1, wherein scraping means are provided, which are operable to scrape soot from said baffle walls.

4. The improvement set forth in claim 1, wherein
said accumulating container is provided with means to permit removal of accumulated soot from said accumulating container, and scraping means are provided to scrape soot from said baffle walls.

5. The improvement set forth in claim 1, wherein a voltage source is provided, and at least part of said baffle walls consist of electrodes, which are adapted to be electrically connected to and disconnected from said voltage source.

6. The improvement set forth in claim 5, wherein said electrodes are mounted in said housing to be moveable in response to vibration.

7. The improvement set forth in claim 5, wherein switch means are provided for electrically connecting said electrodes to and for disconnecting them from said voltage source.

8. The improvement set forth in claim 7, wherein
said voltage source is adapted to charge said electrodes with a predetermined polarity, and said apparatus further comprises a corona discharge device arranged to allow said soot-laden exhaust gases to pass thereby before they enter said housing and is operable to electrically charge said soot in said exhaust gases with a polarity which is opposite to that of said electrodes.

9. The improvement set forth in claim 3, wherein said scraping means comprises a scraping plate having slots therein aligned with said baffle walls, and means for moving said scraping plate so that said baffle walls extend through said slots so as to scrape said soot therefrom.

10. The improvement set forth in claim 9, wherein said means for moving said scraping plate comprises a handle fixed to said plate and extending through said housing.

11. In an apparatus for collecting soot from soot-laden exhaust gases, flowing in an exhaust gas line of an air-compressing internal combustion engine, said apparatus comprising a housing adapted to be incorporated in said exhaust gas line to allow said soot-laden exhaust gases to pass therethrough, baffle walls contained in said housing and arranged to repeatedly deflect the exhaust gases flowing through said housing to cause soot to be separated from said exhaust gases and to deposit, at least in part, on said baffle walls, and an accumulating container disposed beneath said baffle walls and arranged to receive soot which has been separated from said exhaust gases at said baffle walls, the improvement comprising:

means included in said apparatus to cause soot deposited on at least part of said baffle walls to be be removed therefrom and to fall into said accumulating container;

said accumulating container being adapted to permit soot accumulated in said container to be removed from said apparatus; and a ram contained in said accumulating container which is displaceable to compact soot which has accumulated in said accumulating container.

12. The improvement set forth in claim 11, wherein said accumulating container is detachably connected to said housing.

13. The improvement set forth in claim 11, wherein scraping means are provided, which are operable to scrape soot from said baffle walls.

14. The improvement set forth in claim 11, wherein
said accumulating container is provided with means to permit removal of accumulated soot from said accumulating container, and scraping means are provided to scrape soot from said baffle walls.

15. The improvement set forth in claim 11, wherein a voltage source is provided, and at least part of said baffle walls consist of electrodes, which are adapted to be electrically connected top and disconnected from said voltage source.

16. The improvement set forth in claim 15, wherein switch means are provided for electrically connecting said electrodes to and for disconnecting them from said voltage source.

17. The improvement set forth in claim 16, wherein
said voltage source is adapted to charge said electrodes with a predetermined polarity, and said apparatus further comprises a corona discharge device arranged to allow said soot-laden exhaust gases to pass thereby before they enter said housing and is operable to electrically charge said soot in said exhaust gases with a polarity which is opposite to that of said electrodes.

18. The improvement set forth in claim 13, wherein said scraping means comprises a scraping plate having slots therein aligned with said baffle walls, and means for moving said scraping plate so that said baffle walls extend through said slots so as to scrape said soot therefrom.

19. The improvement set forth in claim 18, wherein said means for moving said scraping plate comprises a handle fixed to said plate and extending through said housing.

* * * * *

UNITED STATES PATENT AND TRADEMARK OFFICE
CERTIFICATE OF CORRECTION

PATENT NO. : 4,823,549
DATED : APRIL 25, 1989
INVENTOR(S) : FRANZ MOSER

It is certified that error appears in the above-identified patent and that said Letters Patent is hereby corrected as shown below:

Cover page, column 1, item 63 , after "844,836", delete "Mar. 17, 1986," and substitute therefor --Mar. 27, 1986,--;

Column 1, line 10, after "844,836", delete "Mar. 17, 1986," and substitute therefor --Mar. 27, 1986,--.

Signed and Sealed this

Twenty-eighth Day of November 1989

Attest:

JEFFREY M. SAMUELS

Attesting Officer     Acting Commissioner of Patents and Trademarks